April 17, 1962  W. WAGNER  3,030,100
HYDRAULIC SHOCK ABSORBERS
Filed April 21, 1961  3 Sheets-Sheet 1
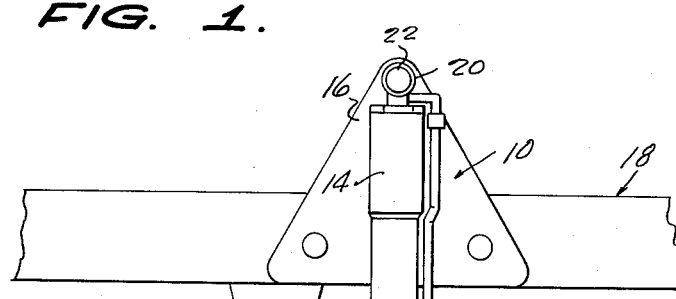
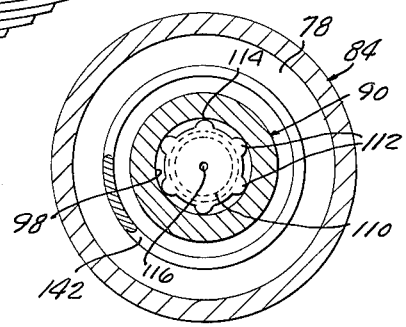
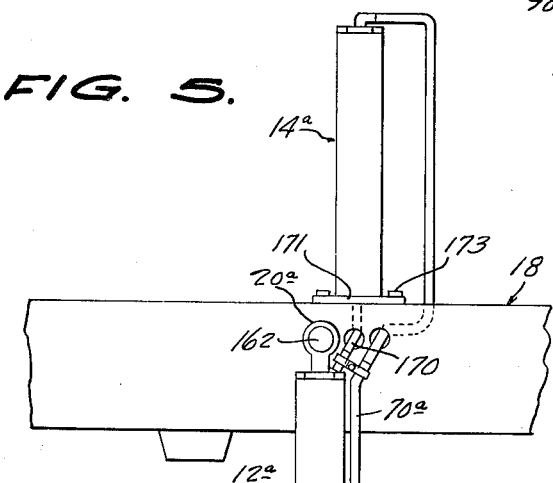
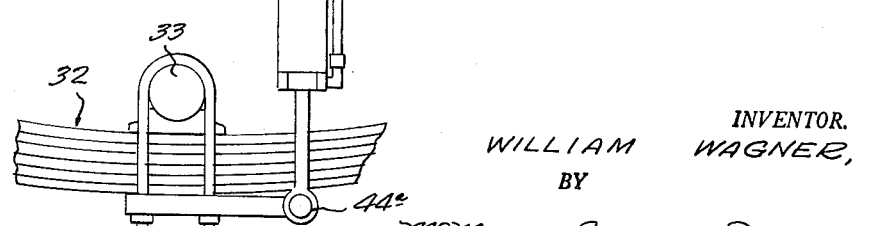
INVENTOR.
WILLIAM WAGNER,
BY
McMorrow, Berman & Davidson
ATTORNEYS.

April 17, 1962
W. WAGNER
3,030,100
HYDRAULIC SHOCK ABSORBERS
Filed April 21, 1961
3 Sheets-Sheet 2
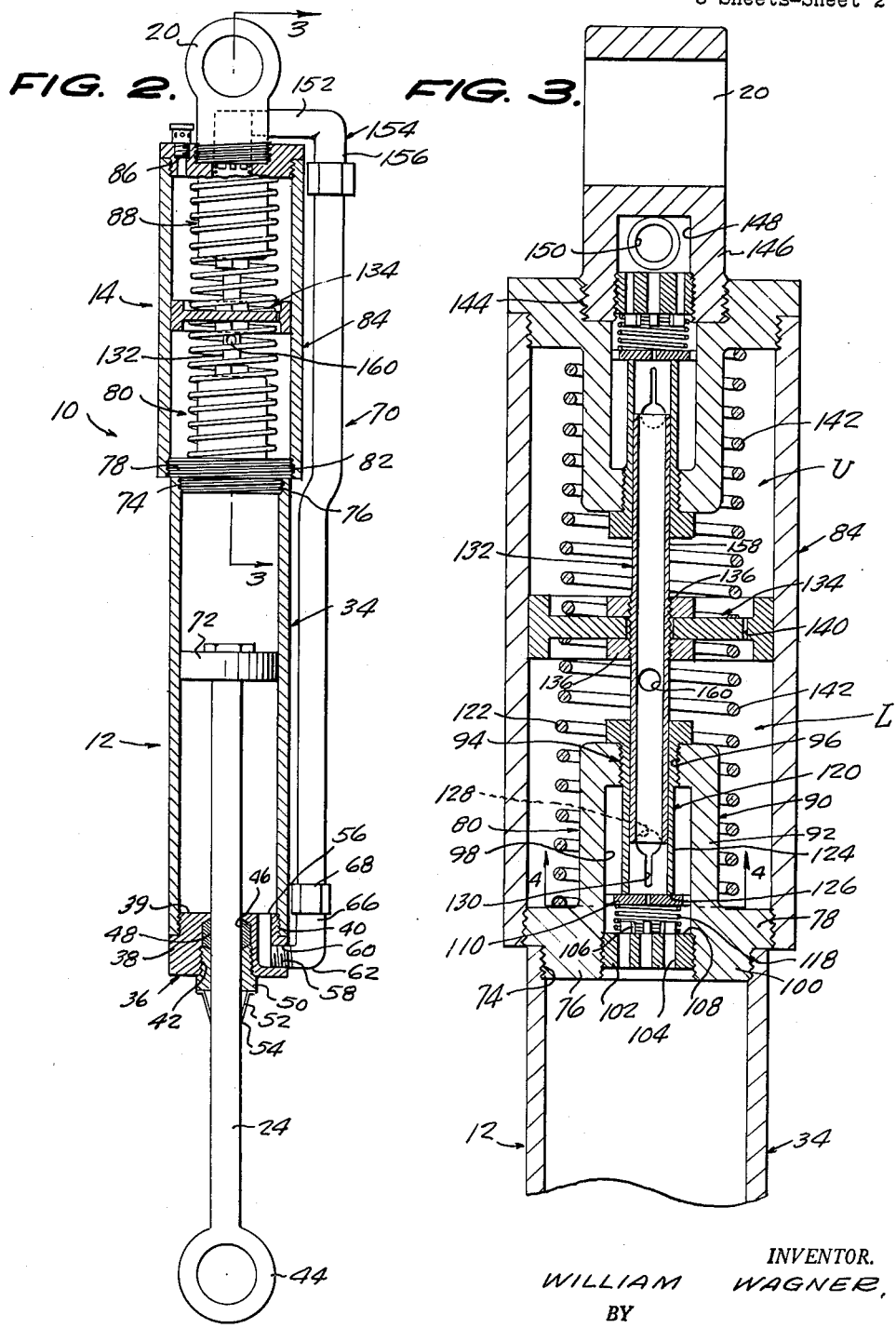
INVENTOR.
WILLIAM WAGNER,
BY
McMorrow, Berman & Davidson
ATTORNEYS.

April 17, 1962 W. WAGNER 3,030,100
HYDRAULIC SHOCK ABSORBERS
Filed April 21, 1961 3 Sheets-Sheet 3
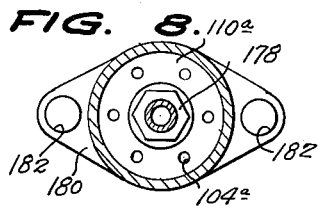
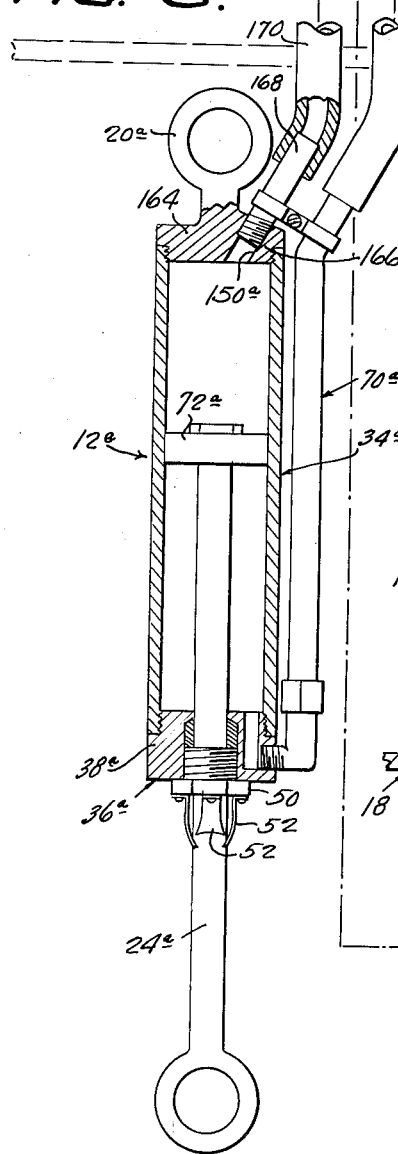
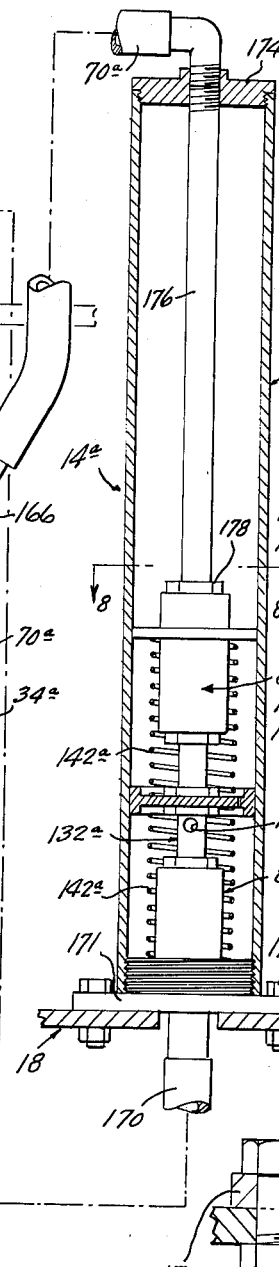
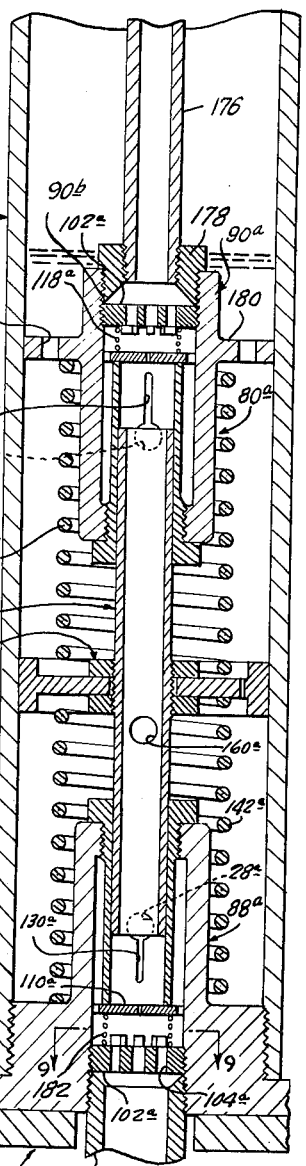
INVENTOR.
WILLIAM WAGNER,
BY
McMorrow, Berman & Davidson
ATTORNEYS.

United States Patent Office 3,030,100
Patented Apr. 17, 1962

3,030,100
HYDRAULIC SHOCK ABSORBERS
William Wagner, Box 366, R2 2nd Ave., Absecon, N.J.
Filed Apr. 21, 1961, Ser. No. 104,696
5 Claims. (Cl. 267—8)

This invention relates to improvements in hydraulic shock absorbers for spring suspension vehicles, and more particularly to novel shock absorbers of this type having separate working and control cylinders.

The primary object of the invention is the provision of more efficient and effective shock absorbers of the kind indicated wherein the control cylinder has a vented free floating piston which is automatically centered in the cylinder by means of opposed springs, the floating piston having fixed thereto a ported gate tube which extends at opposite sides of the piston, the gate tube having open ends which work in tubes spaced from the housings of valve assemblies which include check valves, the sidewalls of the tubes having ports which are graduated in width, in directions toward the check valves, for gradient action, as the gate tube is moved in opposite directions and partially or wholly closes the gradient ports.

Another object of the invention is the provision of shock absorbers of the character indicated above, wherein one of the check valves is in communication with an end of the working cylinder and the other check valve is in communication with the other end of the working cylinder, at opposite sides of a solid piston in the working cylinder, the check valves having ported valve sleeves and vented valve discs, and springs which bias the discs away from the valve bodies, the strengths of the springs and the valve bodies and plates being arranged so that the check valves do not close and produce hydraulic blocks to transfers of fluid therethrough unless and until the piston of the working cylinder has been moved, in other directions, through predetermined amplitudes, and the floating piston in the control cylinder has been moved through proportional amplitudes.

A further object of the invention is the provision of a shock absorber of the character indicated above wherein the working cylinder and the control cylinder are connected together in end-to-end relationship as a unit, so as to provide a relatively long shock absorber for use where vehicle chassis and wheel suspensions permit.

Yet another object of the invention is the provision of a shock absorber of the character indicated above, wherein the working cylinder and the control cylinder are separate, to enable the working cylinder to be connected to the vehicle chassis and the wheel suspension, where limited space therebetween is available, with the control cylinder mounted in another adjacent location, as upon the chassis above the working cylinder.

Other important objects and advantageous features of the invention will be apparent from the following description and the accompanying drawings, wherein, for purposes of illustration only, a specific form of the invention is set forth in detail.

In the drawings:

FIGURE 1 is a fragmentary side elevation showing a unitary shock absorber of the present invention installed on a vehicle chassis side member and operatively connected to a spring axle suspension;

FIGURE 2 is an enlarged vertical longitudinal section taken through the shock absorber of FIGURE 1;

FIGURE 3 is a further enlarged fragmentary transverse section taken on the line 3—3 of FIGURE 2 and showing the floating piston in its median or centered position;

FIGURE 4 is a horizontal section taken on the line 4—4 of FIGURE 3;

FIGURE 5 is a side elevation showing another shock absorber of the present invention, comprising a working cylinder mounted in a vehicle chassis side member and operatively connected to a spring axle suspension, and a control cylinder mounted on and upstanding from the chassis side member;

FIGURE 6 is an enlarged and contracted schematic view showing the working cylinder and the control cylinder in vertical transverse section;

FIGURE 7 is a further enlarged fragmentary vertical transverse section taken through the control cylinder of FIGURE 6, its floating piston being shown in its median or centered position;

FIGURE 8 is a horizontal section taken on the line 8—8 of FIGURE 6; and

FIGURE 9 is a fragmentary horizontal section taken on the line 9—9 of FIGURE 7.

Referring in detail to the drawings, wherein like and related numerals designate like and related parts throughout the several views, and first to FIGURES 1 through 4, the shock absorber therein shown and generally designated 10, comprises a unit composed of a working cylinder 12 on whose upper end is secured a control cylinder 14. Where the shock absorber 10 is positioned vertically and is of greater height than a conventional shock absorber to be replaced, a vertically elongated bracket 16 may be provided and be fixed to such as a side member 18 of a vehicle chassis, the control cylinder 14 having an eye 20, on its upper end, which is journaled, as indicated at 22, on an upper part of the bracket 16, with the downwardly-extending piston rod 24 of the working cylinder 12 journaled, as indicated at 26, to a bracket 28 which is connected, as indicated at 30, to a spring axle suspension, generally designated 32.

As shown in FIGURE 2, the working cylinder 12 comprises an open-ended cylinder element 34, preferably of greater length but smaller in diameter than the control cylinder 14. The lower end of the working cylinder element 34 is closed by a plug 36 having a solid body 38 having a reduced diameter upper portion 39 which is threaded, as indicated at 40, into the lower end of the cylinder element 34. The plug body 38 is provided with an axial counter-bore 42 whose lower portion is larger in diameter than the piston rod 24 which works through the smaller diameter aperture 46, at the upper end of the counter-bore 42. An annular compressible seal 48 in the counter-bore receives the piston rod, therethrough, and is compressed in place by a tubular gland 50 which is threaded upwardly in the lower end of the counter-bore. The gland carries, on its lower end, circumferentially spaced piston rod scraper blades 52, which are angled toward the piston rod 24 and has lower edges 54 in scraping relation thereto, for the purpose of cleaning the piston rod of an accumulation, as it moves upwardly into the working cylinder element 34. The plug 38 has an eccentric vertical passage 56, which opens, at its upper end, to the interior of the cylinder element 34, and, at its lower end, opens to a radial passage 58, into which is threaded, as indicated at 60, the lateral nipple 62 of a metal fitting to whose vertical arm 66 is connected, as indicated at 68, the lower end of a flexible conduit or hose 70.

The piston rod 24 has fixed, on its upper end, a solid piston 72, and has, on its lower end, the journal eye 44. The upper end of the cylinder element 34 is internally threaded, as indicated at 74, to receive a reduced diameter boss 76 on a large diameter annular disc 78, which is part of a lower check valve assembly 80 of the control cylinder 14, and which is threaded, as indicated at 82, into the lower end of the cylinder element 84 of the control cylinder 14.

The control cylinder element 84 has threaded, in its upper end, as indicated at 86, an upper check valve assembly 88 which is similar to but is reversed with respect to the lower check valve assembly 80, so that description of one check valve assembly suffices for description of the other. Each of the check valve assemblies comprises a cup-shaped valve housing 90 having a cylindrical sidewall 92, and an end wall 94 provided with an axial threaded opening 96. The annular discs 78 surround the sidewalls 92, at the open ends thereof. The blind bores 98 of the valve housings 90 are threaded at their open ends, as indicated at 100, to receive relatively thick valve bodies 102, which are provided, as shown in FIGURE 9, with a plurality of equally circumferentially spaced vertical vents 104. Between the vents 104, stop lugs 106 extend inwardly from the inner ends 108 of the valve bodies 102, so as to prevent valve discs 110 from reaching and completely closing the vents 104, under extreme conditions which are hereinafter described.

The valve discs 110, as shown in FIGURE 4, are smaller in diameter than the blind bores 98 of the valve housings 90, and have pluralities of equally circumferentially spaced radial lugs 112 extending outwardly therefrom and having rounded terminals 114 which bear slidably against the housing sidewalls 92. The valve discs 110 have small center vents 116. Helical shock absorbing springs 118 surround the stop lugs 106 and are compressed between the valve discs 110 and the valve bodies 102.

As shown in FIGURE 3, valve sleeves 120 are threaded through the openings 96 of the end walls 94 of the valve housings 90, and have enlarged diameter heads 122, on their inner ends, to engage the end walls 94 and limit outward extension of the sleeves 120 toward the valve discs 110. The sleeves 120 are cylindrical and have sidewalls 124 which have outer ends 126 which are axially spaced from the valve bodies 102, and which are in stop engagement with the valve discs 110. The sidewalls 124 of the sleeves 120 are imperforate except for outwardly graduated ports, here shown as keyhole ports, having relatively larger diameter inner end portions 128 and relatively narrow outwardly extending portions 130.

An elongated gate tube 132 is provided, which is shorter than the distance between the outer ends 126 of the valve sleeves 120, and which has end portions sliding in the valve sleeves. A floating piston 134 is fixed on the gate tube 132, at its middle, as by means of nuts 136 engaged on a threaded portion 138 of the gate tube and engaged with opposite sides of the piston 134. The piston 134 is solid and imperforate except for a small eccentric vent 140. Helical springs 142 which are longer and stronger than the check valve springs 118, surround the valve housings 90, and are compressed between the valve housing discs 78 and the opposite sides of the piston 134. The springs 142 are of substantially the same strength and are sufficiently long to absorb the first portions of the raisings and lowerings of wheels (not shown) on the suspension axle 32, as the wheels travel over irregularities in a road surface, before the check valve assemblies become involved in absorbing and checking the final portions of such raisings and lowerings, which are hydraulically imposed upon the floating piston 134, by corresponding upward and downward movements of the piston 72 of the working cylinder 12.

In the case of the housing 90 of the upper valve check valve assembly 88, the outer end thereof is provided with a threaded annular recess 144 which surrounds its counter-bore 98, into which the shank 146 of an upstanding journal eye 20 is threaded. The shank 146 is provided with an axial recess 148 into whose inner end the valve body of the upper valve assembly 88 is threaded, instead of into the counter-bore thereof, as in the case of the lower valve assembly 80. The shank 146 is provided with a radial port 150 which opens to the recess 148, into which is threaded the arm 152 of a metal fitting 154 which has a pendant arm 156, to which the upper end of the hose 70 is connected.

The gate tube 132 has a sidewall 158 which is imperforate except for a relatively large port 160 which is located between the floating piston 134 and the lower valve assembly housing 90, and communicates only with the lower chamber L below the piston 134. The gate tube 132 has no communication with the upper chamber U above the piston 134.

In operation, as the piston 72 of the working cylinder 12 is elevated by an elevation of the spring suspension from a median position, fluid present in the cylinder element 34, above the piston 72, is forced upwardly, raises the lower check valve assembly valve disc 110, and passes upwardly therearound and into the counter-bore 98, through the lower gradient port of the gate tube 132 into the interior of the tube 132 and discharges into the lower chamber L of the control cylinder element 84, and forces the floating piston 134 upwardly against the resistance of the upper shock absorbing spring 142. As the piston 134 and the gate tube 132 are thus moved upwardly together, the upper end of the gate tube begins to occlude the graduated keyhole port of the valve sleeve of the upper check valve assembly 88. The occlusion progresses from the inner port portion 128 to the narrower port portion 130, so that a fluid block is established gradually and gradiently in a manner to cushion the final part of the upward movement of the floating piston 134, rather than produce a sudden and complete fluid block which would result in the sudden imposition of a shock on the vehicle suspension.

As the upward travel of the working cylinder piston 72 is arrested, and downward travel thereof begins, as the wheel suspension returns toward or moves below its sudden position, the upper shock absorbing spring 142 returns the floating piston 134 gradually to its median position in the control cylinder element 84, so that the gate tube 132 gradually uncovers the upper valve sleeve keyhole port. The stop lugs 106 are provided on the valve bodies 102 to stop the valve discs 110 from engaging the valve bodies, should the gate tube 132 be worked into such an extreme position, due to an extreme elevation or depression of the spring suspension, as to engage against and move a related valve disc 110.

Whenever the piston 72 of the working cylinder subsides below a median position, or subsides from an elevated position, fluid is sucked back into the working cylinder element 34, above the piston 72, from the lower chamber L of the control cylinder 14, only until the floating piston 134 has subsided to a major extent, cushioned by the lower shock absorbing spring 142, and the lower end of the gate tube 132 reaches and occludes the lower valve check assembly valve sleeve keyhole port. Thus, in upward and downward strokes of the working cylinder piston 72 and corresponding downward and upward strokes of the floating piston 134, fluid is gradually bled out of the control cylinder chambers L and U, ahead of the floating piston 134, until the final stages of the strokes of the floating piston. Correspondingly, the final stages of upward and downward strokes of the working cylinder piston 72 are slowed down and arrested by the presence of confined fluid above or below the piston 72.

The shock absorber shown in FIGURES 5 through 7, has its working cylinder 12$^a$ pivoted, at its upper end, as indicated at 162, to the chassis side member 18, by means of an upstanding eye 20$^a$ on a solid head 164 which closes the upper end of its cylinder element 34$^a$. The head 164 has an upwardly inclined port 150$^a$ in which is threaded, as indicated at 166, the lower end of a metal fitting 168, on whose upper end is secured the lower end of a flexible hose 170 which leads to the lower end of the cylinder element 84$^a$ of the control cylinder 14$^a$. A flexible hose 70$^a$, like the hose 70 of the working cylinder 12 of FIGURES 1 to 4, is similarly connected, at its lower end, to the lower end of the working cylinder element 34$^a$, and leads upwardly to the upper end of the control cylinder 14$^a$.

The control cylinder 14$^a$ has a lateral flange 171 on the disc 74$^a$ of its lower valve assembly valve housing 90$^a$, which is bolted, as indicated at 173, upon the top of the chassis side member 18. The hoses 170 and 70ª can lead through openings in the side members, as shown in FIGURE 5.

Otherwise the working cylinder 12ª and the control cylinder 14ª are the same in construction as the working cylinder 12 and the control cylinder 14, except that, as shown in FIGURES 6 and 7, the upper check valve assembly 88 of the control cylinder 14ª is depressed below the upper end of the control cylinder element 84ª, said upper end is closed by a head 174, and a rigid axial pipe 176 extends downwardly through the head 174 to the upper valve assembly 88ª. The lower end of the pipe 176 is threaded into an annular adapter 178 which is threaded in the counter-bore 90ᵇ of the upper valve housing 90ª, and the upper valve housing 90ª is fixed to the cylinder element 84ª, as by means of a lateral annular flange 180 which is formed with vents 182 which provide communication between the upper chamber U and a top chamber T in the cylinder element, above the upper valve assembly 88ª. This provides for a greater volume of fluid in the control cylinder element 84ª, but the operations of the upper and lower check valve assemblies 80ª and 88ª and the gate tube 132ª are substantially the same as described hereinabove in connection with the shock absorbers of FIGURES 1 to 4.

Although there have been shown and described herein preferred forms of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A hydraulic shock absorber comprising a working cylinder having first and second ends, a solid piston working in said cylinder and having a piston rod extending through said first end, a control cylinder having first and second ends, said control cylinder having first and second check valve assemblies in said first and second ends of the control cylinder, first means providing communication between the second end of the working cylinder and the first end of the control cylinder through said first check valve assembly, a second means providing communication between the first end of the working cylinder and the second end of the control cylinder, a floating piston working in said control cylinder between said first and second check valve assemblies, a gate tube extending through and secured to said floating piston and extending at opposite sides thereof, said floating piston dividing the interior of the control cylinder into first and second chambers, said gate tube having a port located in the first chamber, said check valve assemblies comprising open-ended valve sleeves in which ends of the gate tube slide, said sleeves having sidewalls provided with ports which are graduated in width in directions outwardly away from the floating piston, first and second helical shock absorbing springs compressed between the first and second valve assemblies and opposite sides of the floating piston and adapted to center the floating piston relative to said chambers, in a median position, said check valve assemblies having housings in which said valve sleeves are mounted, said housings having counter-bores in which said sleeves are concentrically spaced, check valve bodies in the outer ends of the counter-bores, said valve bodies having vents extending therethrough, vented check valve discs working in said counter-bores at locations inwardly of the valve bodies, and expanding springs compressed between the valve bodies and the valve discs, said floating piston being responsive to movements of the piston of the working cylinder to move toward either end of the control cylinder for positioning one end of the gate tube in occluding relation to a graduated valve sleeve port while the other end of the gate tube uncovers the other graduated valve sleeve port.

2. A hydraulic shock absorber comprising a working cylinder having first and second ends, a solid piston working in said cylinder and having a piston rod extending through said first end, a control cylinder having first and second ends, said control cylinder having first and second check valve assemblies in said first and second ends of the control cylinder, first means providing communication between the second end of the working cylinder and the first end of the control cylinder through said first check valve assembly, second means providing communication between the first end of the working cylinder and the second end of the control cylinder, a floating piston working in said control cylinder between said first and second check valve assemblies, a gate tube extending through and secured to said floating piston and extending at opposite sides thereof, said floating piston dividing the interior of the control cylinder into first and second chambers, said gate tube having a port located in the first chamber, said check valve assemblies comprising open-ended valve sleeves in which ends of the gate tube slide, said sleeves having sidewalls provided with ports which are graduated in width in directions outwardly away from the floating piston, first and second helical shock absorbing springs compressed between the first and second valve assemblies and opposite sides of the floating piston and adapted to center the floating piston relative to said chambers, in a median position, said check valve assemblies having housings in which said valve sleeves are mounted, said housings having counter-bores in which said sleeves are concentrically spaced, check valve bodies in the outer ends of the counter-bores, said valve bodies having vents extending therethrough, vented check valve discs working in said counter-bores at locations inwardly of the valve bodies, and expanding springs compressed between the valve bodies and the valve discs, said floating piston being responsive to movements of the piston of the working cylinder to move toward either end of the control cylinder for positioning one end of the gate tube in occluding relation to a graduated valve sleeve port while the other end of the gate tube uncovers the other graduated valve sleeve port, said working cylinder and said control cylinder being in end to end relationship, the second end of the working cylinder being open and connected to the first end of the control cylinder and constituting said first communication means, said control cylinder having a mounting eye on its second end.

3. A hydraulic shock absorber comprising a working cylinder having first and second ends, a solid piston working in said cylinder and having a piston rod extending through said first end, a control cylinder having first and second ends, said control cylinder having first and second check valve assemblies in said first and second ends of the control cylinder, first means providing communication between the second end of the working cylinder and the first end of the control cylinder through said first check valve assembly, second means providing communication between the first end of the working cylinder and the second end of the control cylinder, a floating piston working in said control cylinder between said first and second check valve assemblies, a gate tube extending through and secured to said floating piston and extending at opposite sides thereof, said floating piston dividing the interior of the control cylinder into first and second chambers, said gate tube having a port located in the first chamber, said check valve assemblies comprising open-ended valve sleeves in which ends of the gate tube slide, said sleeves having sidewalls provided with ports which are graduated in width in directions outwardly away from the floating piston, first and second helical shock absorbing springs compressed between the first and second valve assemblies and opposite sides of the floating piston and adapted to center the floating piston relative to said chambers, in a median position, said check valve assemblies having housings in which said valve sleeves are mounted, said housings having counter-bores in which said sleeves are concentrically spaced, check valve bodies in the outer ends of the counter-bores, said valve bodies having vents extending therethrough, vented check valve discs working in said counter-bores at locations inwardly of the valve bodies, and expanding springs compressed between the valve bodies and the valve discs, said floating piston being responsive to movements of the piston of the working cylinder to move toward either end of the control cylinder for positioning one end of the gate tube in occluding relation to a graduated valve sleeve port while the other end of the gate tube uncovers the other graduated valve sleeve port, said working cylinder having a head closing its second end and having a mounting eye thereon, said control cylinder being displaced relative to said working cylinder.

4. A hydraulic shock absorber comprising a working cylinder having first and second ends, a solid piston working in said cylinder and having a piston rod extending through said first end, a control cylinder having first and second ends, said control cylinder having first and second check valve assemblies in said first and second ends of the control cylinder, first means providing communication between the second end of the working cylinder and the first end of the control cylinder through said first check valve assembly, second means providing communication between the first end of the working cylinder and the second end of the control cylinder, a floating piston working in said control cylinder between said first and second check valve assemblies, a gate tube extending through and secured to said floating piston dividing the interior of the control cylinder into first and second chambers, said gate tube having a port located in the first chamber, said check valve assemblies comprising open-ended valve sleeves in which ends of the gate tube slide, said sleeves having sidewalls provided with ports which are graduated in width in directions outwardly away from the floating piston, first and second helical shock absorbing springs compressed between the first and second valve assemblies and opposite sides of the floating piston and adapted to center the floating piston relative to said chambers, in a median position, said check valve assemblies having housings in which said valve sleeves are mounted, said housings having counter-bores in which said sleeves are concentrically spaced, check valve bodies in the outer ends of the counter-bores, said valve bodies having vents extending therethrough, vented check valve discs working in said counter-bores at locations inwardly of the valve bodies, and expanding springs compressed between the valve bodies and the valve discs, said floating piston being responsive to movements of the piston of the working cylinder to move toward either end of the control cylinder for positioning one end of the gate tube in occluding relation to a graduated valve sleeve port while the other end of the gate tube uncovers the other graduated valve sleeve port, said working cylinder having a head closing its second end and having a mounting eye thereon, said control cylinder being displaced relative to said working cylinder, in combination with a vehicle chassis and a spring suspension therefor, the suspension being spaced beneath the chassis, the piston rod of the working cylinder being connected to the suspension and the mounting eye to the chassis, said control cylinder being mounted upon the chassis.

5. A hydraulic shock absorber comprising a working cylinder having first and second ends, a solid piston working in said cylinder and having a piston rod extending through said first end, a control cylinder having first and second ends, said control cylinder having first and second check valve assemblies in said first and second ends of the control cylinder, first means providing communication between the second end of the working cylinder and the first end of the control cylinder through said first check valve assembly, second means providing communication between the first end of the working cylinder and the second end of the control cylinder, a floating piston working in said control cylinder between said first and second check valve assemblies, a gate tube extending through and secured to said floating piston and extending at opposite sides thereof, said floating piston dividing the interior of the control cylinder into first and second chambers, said gate tube having a port located in the first chamber, said check valve assemblies comprising open-ended valve sleeves in which ends of the gate tube slide, said sleeves having sidewalls provided with ports which are graduated in width in directions outwardly away from the floating piston, first and second helical shock absorbing springs compressed between the first and second valve assemblies and opposite sides of the floating piston and adapted to center the floating piston relative to said chambers, in a median position, said check valve assemblies having housings in which said valve sleeves are mounted, said housings having counter-bores in which said sleeves are concentrically spaced, check valve bodies in the outer ends of the counter-bores, said valve bodies having vents extending therethrough, vented check valve disc working in said counter-bores at locations inwardly of the valve bodies, and expanding springs compressed between the valve bodies and the valve discs, said floating piston being responsive to movements of the piston of the working cylinder to move toward either end of the control cylinder for positioning one end of the gate tube in occluding relation to a graduated valve sleeve port while the other end of the gate tube uncovers the other graduated valve sleeve port, said check valve bodies having stop lugs projecting inwardly therefrom which prevent the valve discs from engaging the valve bodies and closing their vents.

References Cited in the file of this patent

UNITED STATES PATENTS

| | | |
|---|---|---|
| 1,855,897 | Taylor | Apr. 26, 1932 |
| 2,640,693 | Magrum | June 2, 1953 |

FOREIGN PATENTS

| | | |
|---|---|---|
| 301,761 | Great Britain | Dec. 4, 1928 |